United States Patent [19]
Nathanson et al.

[11] 3,894,332
[45] July 15, 1975

[54] SOLID STATE RADIATION SENSITIVE FIELD ELECTRON EMITTER AND METHODS OF FABRICATION THEREOF

[75] Inventors: Harvey C. Nathanson, Pittsburgh; Richard N. Thomas, Murrysville; Jens Guldberg, Penn Hills, all of Pa.

[73] Assignee: Westinghouse Electric Corporation, Pittsburgh, Pa.

[22] Filed: Nov. 23, 1973

[21] Appl. No.: 418,635

Related U.S. Application Data

[62] Division of Ser. No. 225,517, Feb. 11, 1972, Pat. No. 3,814,968.

[52] U.S. Cl. ...................... 29/578; 29/580; 357/30; 357/31
[51] Int. Cl. ............................................ B01j 17/00
[58] Field of Search ........... 29/578, 580; 357/30, 31

[56] References Cited

UNITED STATES PATENTS

| | | | |
|---|---|---|---|
| 3,466,485 | 9/1969 | Arthur | 313/95 |
| 3,675,314 | 7/1972 | Levi | 29/578 |
| 3,761,785 | 9/1973 | Pruniaux | 29/580 |

*Primary Examiner*—W. Tupman
*Attorney, Agent, or Firm*—W. G. Sutcliff

[57] ABSTRACT

A solid state radiation sensitive field emitter cathode comprising a single crystal semiconductor member having a body portion with a uniform array of closely spaced and very sharp electron emitting projections from one surface in the form of needles or whisker like members. Electrons are emitted into vacuum when a planar-parallel positive anode is mounted in close proximity to the surface. The cathode is responsive to input radiation such as electrons or light directed onto the cathode in modifying the electron emission from the array of electron emitter projections. The method of manufacturing the cathode by providing a predetermined pattern or mosaic of islands of a material exhibiting a greater etch resistant property than the semiconductor material, on a wafer of a semiconductor material and then etching out between and beneath the islands to undercut to a point where the islands are supported by only a small whisker of the semiconductor material. Removal of the islands results in an electron emitter being exposed from beneath each island wherein carriers generated within the body portion and also carriers generated within the depletion regions of the tips deffuse to the electron emitter projections wherein establishment of a high electric field at the tips of the electron emitter projections results in electron emission primarily due to conduction band tunneling. The device provides about $10^6$ emitting points of close proximity so as to effect photographic-like imaging.

2 Claims, 22 Drawing Figures

52
55

SOLID STATE RADIATION SENSITIVE FIELD ELECTRON EMITTER AND METHODS OF FABRICATION THEREOF

This is a division of application Ser. No. 225,517, filed Feb. 11, 1972, now U.S. Pat. No. 3,814,968.

BACKGROUND OF THE INVENTION

This invention relates generally to cold cathode field electron emitters and more particularly to those of the type where the emitter is responsive to input radiation such as electrons, X-rays or light and particularly radiations in the infrared regions.

Photoemissive type devices are well known in the art and the most common are the tri-alkali antimonides. These structures are sensitive in the visible spectral region but lack sensitivity in the infrared region. In the last few years, a new type of photoemitter known as the III-V compound semiconductor has provided improved sensitivity in the infrared region. These photoemitters rely on the use of monolayer coatings of Cs and $C3_2O$. They suffer disadvantages of requiring high temp processing and very good operating vacuum. Silicon point arrays have neither of these disadvantages.

Field emission type cathodes in which emission occurs in response to an intense electric field are also known. In the last few years work has been done utilizing semiconductors such as silicon with a plurality of whiskers provided thereon and which is sensitive to light. Such a device is described in U.S. Pat. No. 3,466,485 by John R. Arthur et al. Experimental results on single emitter tips are also reported in an article entitled "Photo-Field-Emission from High Resistance Silicon and Germanium" by P. G. Borzyak et al. on page 403, Phys. Stat. Sol. 14,403 (1966). The photo-field-emitting type emitter provides a very sensitive type device. The Arthur et al. arrays are made using a vapour-liquid-solid growth mechanism using gold to "seed" whisker growth. As a result, the Arthur et al. device has the whisker points saturated with gold which is a most effective lifetime-killer. For good photoresponse, high lifetime is essential. Because of poor lifetime, the light in the Arthur et al. device must be directed onto the very tip of the semiconducting points. The prior art teaching has thus failed to recognize or fabricate a device capable of utilizing its full potential. The prior art activity appears to have been mostly in the area of experimentation and has failed to bring forth a device for commercial utilization. The present invention is directed to improved structures and fabrication methods to accomplish improvements over the prior art teaching.

SUMMARY OF THE INVENTION

In accordance with the present invention, there is provided a radiation-sensitive field-emissive cathode wherein an array of electron emitting projections is provided on one surface of a wafer of a suitable semiconductive material such as P-type silicon of 10 ohm cm and greater resistivity. Radiation is directed onto the wafer from the opposite surface with respect to the electron emitter array and carriers are generated within about a 100 micrometers of the emitter tips and diffuse to the emitter tips where they are emitted into the vacuum. The method of fabricating the electron emitter array on a wafer of semiconductive material utilizes photoresist techniques to delineate a predetermined pattern or mosaic of islands of etch-resistant material on the surface of the wafer, followed by etching away the material of the wafer between and beneath the islands until only a needle-like projection member remains below each island. These islands may then be removed to expose a semicqnductive emitting device with an array of needle-like projections formed of the original wafer. This fabrication technique retains the high crystalline perfection of the starting semiconductor material within the structure to ensure that high carrier lifetime is maintained and thereby providing long diffusion paths (about 25 to 250 micrometers) for the carriers. Also no redistribution of impurities can occur in this room temperature process. The improved structure also provides surface regions and coating on surfaces of the semiconductor wafer to enhance sensitivity by increasing absorption of input radiation, reduces loss of input radiation produces generated carriers and minimize dark current generation.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENTS

Figure 1:
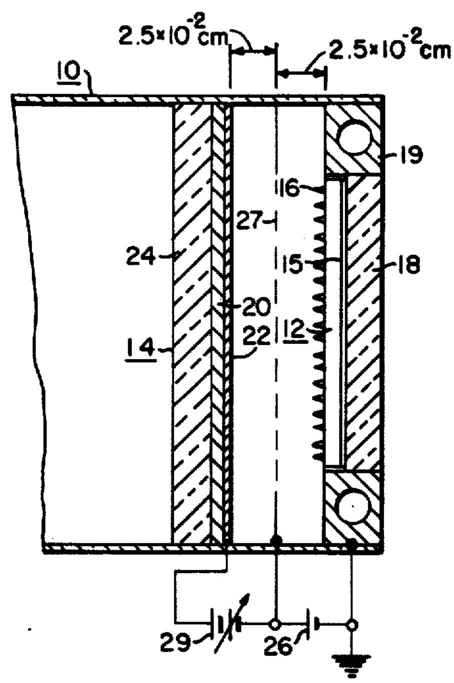
FIG. 1 is a schematic view of an image intensifier incorporating a photocathode in accordance with the teachings of this invention.
Figure 3:
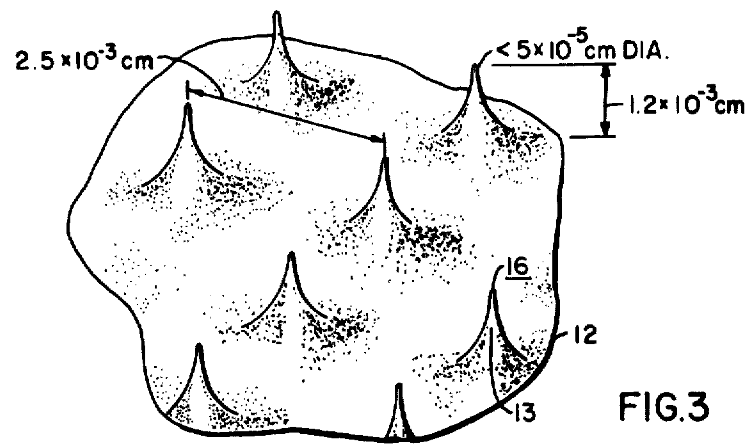
FIG. 3 is a perspective view of the photocathode in FIGS. 1 and 2 illustrating the electron emitter array.
Figure 15A:
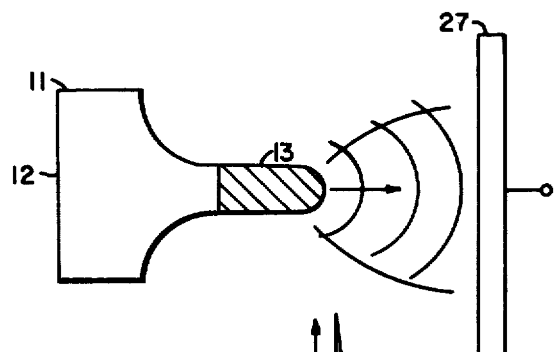
FIGS. 15A and 15B illustrate an electron emitter projection associated with the band diagram illustrating the mechanism of operation of the electron emitters illustrated in FIGS. 1, 2, 10 and 14.
Figure 15B:
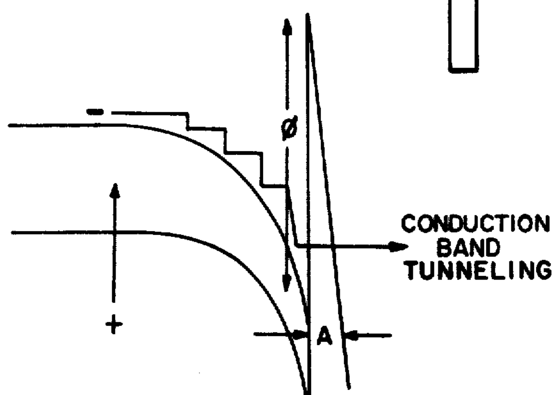
Figure 4:
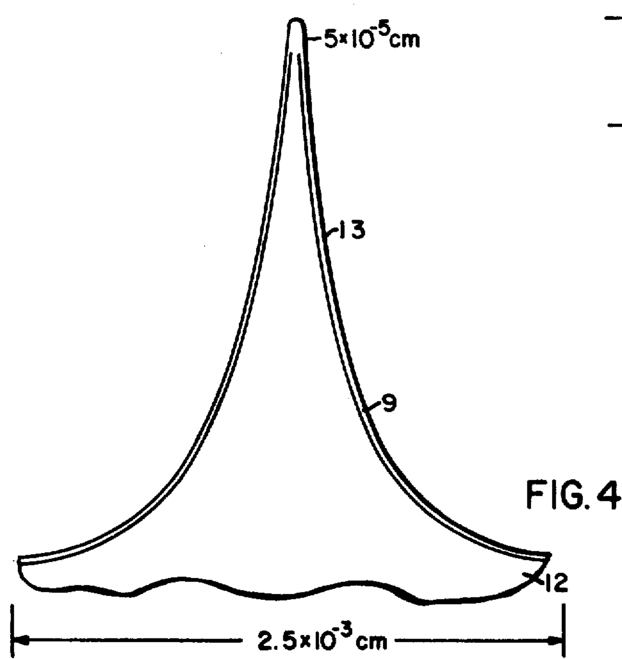
FIG. 4 is a side view of one of electron emitting projections of the array illustrated in FIG. 3.
Figure 5:
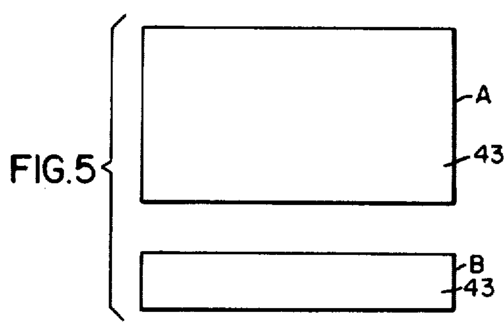
FIGS. 5, 6, 7, 8 and 9 illustrate steps in the manufacture of the photocathode illustrated in FIGS. 1 and 2.

Referring to FIGS. 1, 3 and 4, there is illustrated an image intensifier device including an evacuated envelope 10 having an input window 18 and an output window 24. A photocathode 12 in accordance with the teachings of this invention is provided on the inner surface of the input window 18. Suitable cooling means 19 is provided about the photocathode 12 to control the temperature thereof. It may be necessary in some applications to reduce the dark current due to thermal generation. An output screen 14 is provided on the inner surface of the output window 24. The screen 14 comprises a layer 20 of suitable phosphor material which emits radiation in response to electron bombardment. An electrical conductive coating 22 of a suitable material such as aluminum may be provided on the inner surface of the layer 20. The layer 22 provides not only an electrical connection but is also opaque to and prevents radiation from the phosphor screen 20 being directed back on to the photocathode 12.

An extractor grid electrode 27 is provided between the photocathode 12 and the output screen 14. The electrode 27 is a mesh of electrically conductive material and about 50 to 80 per cent transmissive. The extractor electrode 27 is also sufficiently rigid to prevent distortion due to electrical fields. The extractor electrode 27 should be spaced such a distance as to provide adequate electrical field to cause field emission from the photocathode 12. The electrode 27 may be spaced at a distance of about 250 micrometers from the photocathode 12. A suitable potential provided by a battery 26 of about five thousand volts is connected between the photocathode 12 and the extractor electrode 27. The electrical contact to the photocathode 12 is made by means of a P+ region 15. The output screen 14 may be positioned at a distance of about 250 micrometers from the extractor electrode 27 to provide a variable accelerating potential to accelerate the electrons to the output screen 14. A variable potential source 29 is connected between the output screen 14 and the extractor electrode 27. The variable potential source 29 provides means of varying the output brightness of the device. The extractor electrode 27 may be omitted in some applications and the output electrode 14 will provide a simultaneous extraction and acceleration potential.

The photocathode 12 is of a suitable semiconductor material such as a silicon, germanium, III-V compounds and ternary III-V compound semiconductors. Elemental semiconductors with deep impurity levels such as, silicon doped with gold could also be used. The specific embodiment utilizes P-type silicon material having a resistivity of 0.1 to 160 ohm cm. The photocathode 12 is fabricated from a single crystal wafer. The photocathode 12 comprises a body portion 11 having a thickness of about 25 micrometers. An array 16 of a plurality of projections 13 projects from the body portion 11 to a height of about 12 micrometers. The spacing between the emitting projections 13 may be about 25 micrometers and the diameter of the tip of the projections 13 may be less than 1 micrometer. In the specific device, the diameter of the tips was about 0.5 micrometers. The base of the emitting projection 13 may be about 25 micrometers. The P+ region 15 is provided on surface of the body portion 11 remote to the array 16. A photocathode of 3.2 cm in diameter may have as many as $1.25 \times 10^6$ projection emitters 13.

The general principles of operation of this device are best understood with reference to FIGS. 15, 16, 18, 19, 20 and 21. Electrons are emitted from the sharp point or tip of the emitter projections 13 when placed in close proximity to a positively biased extractor electrode 27 as shown in FIG. 15*a*, due to the field intensification at the tip. At low applied extractor voltages, electrons are emitted from the conduction band of the silicon. The emission is well-described by the Fowler-Nordheim tunneling theory which results in a linear log current vs inverse voltage relationship as shown in region 1 of FIG. 16. At higher applied anode voltages, which are sufficient to overcome shielding effects of surface charge states, penetration of the electric field into the semiconductor tip can occur. A space-charge region which is essentially depleted of mobile carriers is therefore created at the tip of the emitter 13. As a result, it is observed that the log current vs inverse voltage plot assumes a lesser slope as shown in region 2 of FIG. 16, since the supply of electrons in the conduction band at the surface available for emission is limited. In this source-limited mode of operation, the device is sensitive to input radiation, such as photons or incident electrons, which alters the electron population in the conduction band and thereby increases the emission current. In detail, operation thus depends upon the formation of electron-hole pairs by the input radiation within the space-charge region at the tip of the emitter 13 and/or within a diffusion length in the bulk p-region of the emitter 13 and body 11. Electrons generated within this bulk p-region diffuse into the space-charge region. Because of the built-in electric field within the space-charge region, electrons created or diffusing into this region, are therefore swept to the tip of the emitter 13 from whence they are emitted. In the case of input radiation consisting of photons, each absorbed photon generates an average of one electron-hole pair. With electrons incident on the device however, each incident electron creates one electron-hole pair per 3.5 eV energy on the average. Substantial electron gains are therefore possible with energetic electrons, e.g. 10KeV electrons result in gains of 2000.

Figure 19:
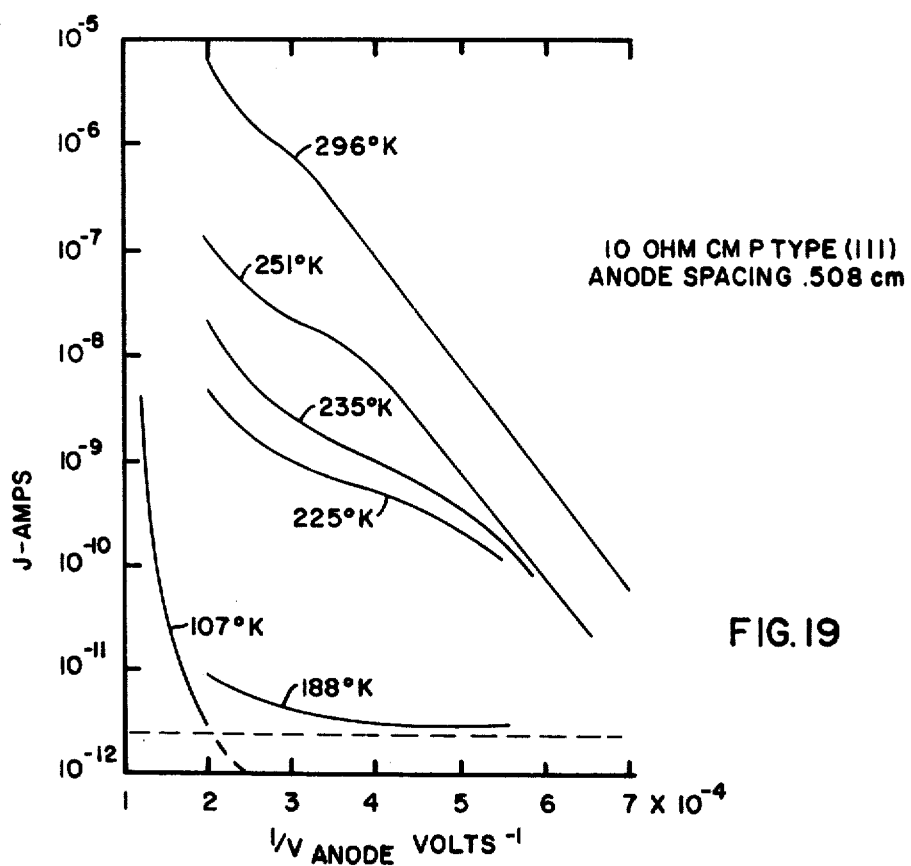
FIG. 19 illustrates the dark emission characteristics of a 10 ohm cm p-type (111) silicon field emitter array at different temperatures.

The dark current emission characteristics shown in FIG. 19 is of an unpassivated photocathode and indicates that the dark current is substantially reduced at operating temperatures below room temperature. Furthermore, the dependence of dark current of the device shown in FIG. 20 yields an activation energy of 0.56eV. This value of activation energy which is equal to one-half of the band gap energy of silicon indicates unambiguously that thermal generation via mid-gap bulk and surface states is the source of dark current in the device. Thus, substantial reductions in the dark current are possible with the application of well-known oxide passivation and gettering techniques to the device.

Figure 18:
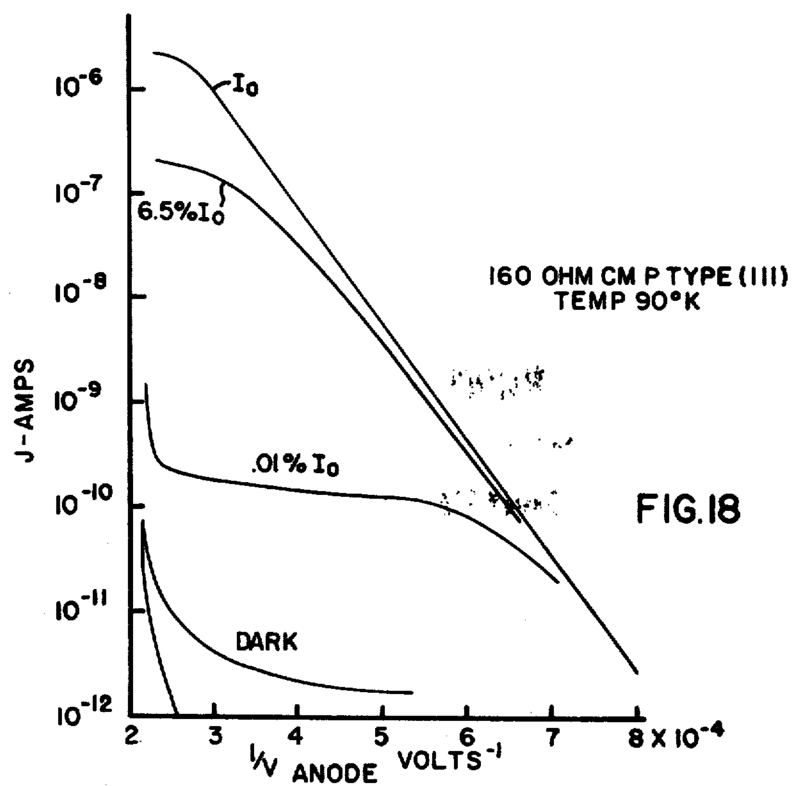
FIG. 18 illustrates the emission characteristics of 160 ohm cm p-type (111) silicon field emitter array at 90°K in the dark and at different intensities of 1.06 micron radiation inputs.

In FIG. 18, a family of curves for different values of light at a wavelength of 1.06 microns is shown with the temperature held at 90°K.

The extended source-limited behaviour observed at the lowest light levels and the fact that the photocurrent remains approximately constant over a range of applied anode voltages is of considerable interest. During fabrication, small variations in tip diameter and height of the emitters projections 13 within an array 16 may occur. Small variations in the electric field at the tips of individual emitter 13 would therefore occur when this array is operated at constant anode voltage. However, due to the relatively insensitivity of the photocurrent to changes in the electric field in the source-controlled mode, the emitted photocurrent from each emitter should be constant. In other words, certain nonuniformities of the point emitter dimensions can be tolerated without affecting the photoemission uniformity.

Figure 21:
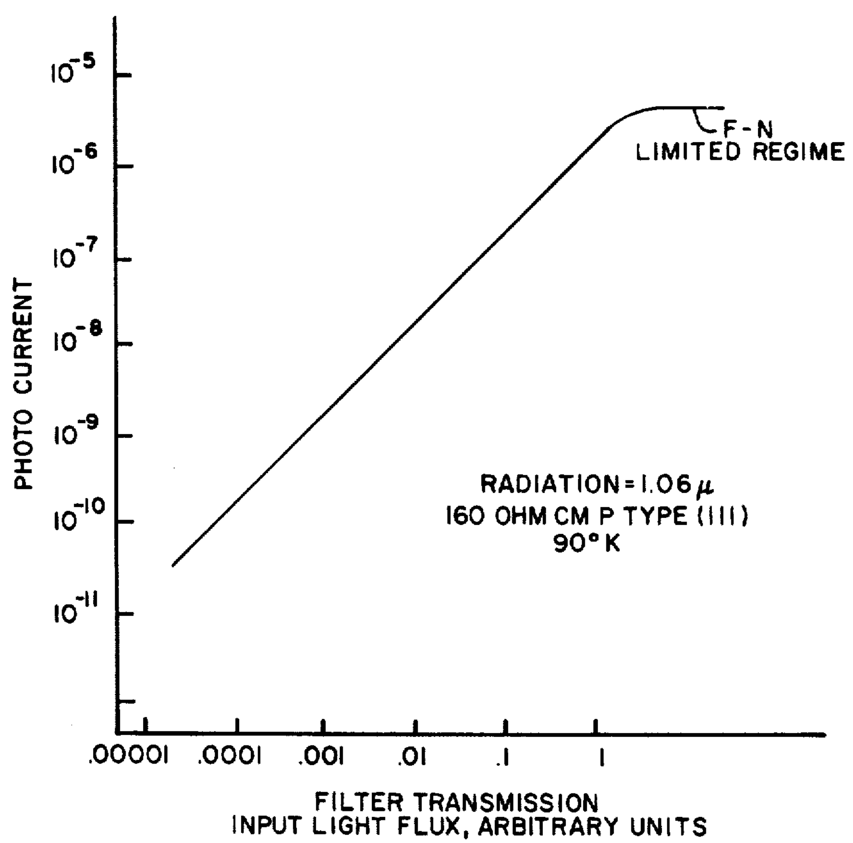
FIG. 21 illustrates a plot of a photocathode response to input light.

In FIG. 21 the linearity between photocurrent and illumination level over 5 orders of magnitude is shown and corresponds to $\gamma = 1$. Saturation is determined by the eventual changeover to tunneling-limited emission at high light-flux levels. The light level at which saturation occurs can be preset by proper choice of the applied anode voltage, and can be used to minimize blooming of bright elements in an otherwise dimly illuminated scene.

Figure 2:
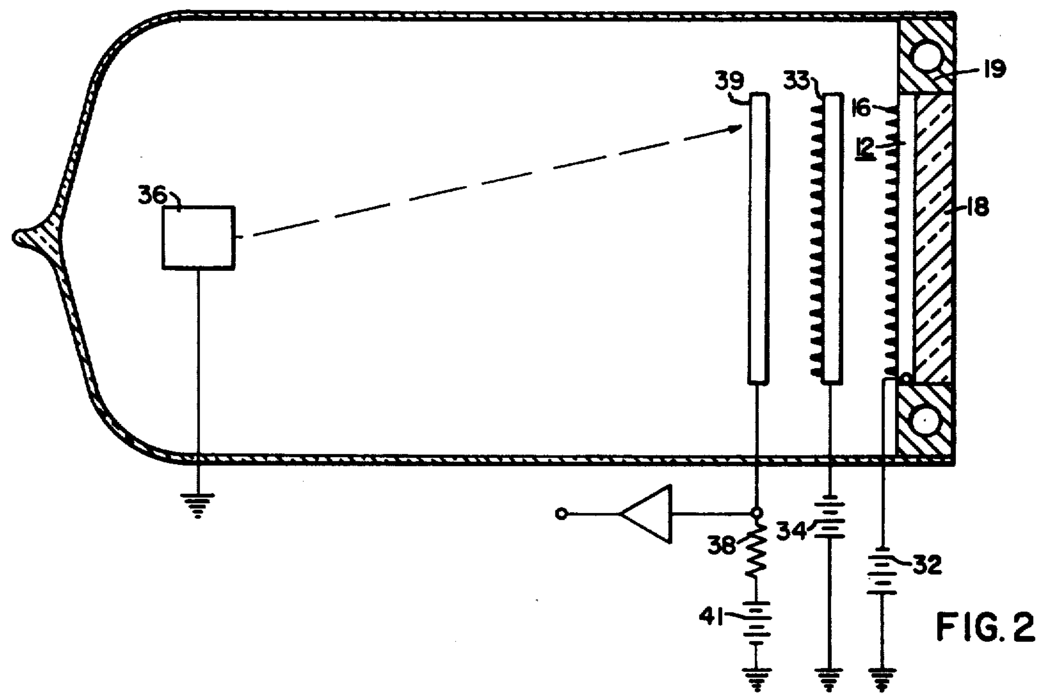
FIG. 2 is a schematic showing of a camera tube incorporating a photocathode and an electron multiplier in accordance with the teachings of this invention.

In FIG. 2, there is illustrated a pick-up tube which again utilizes the photocathode 12 as described with respect to FIGS. 1, 3 and 4. The pick-up tube comprises an evacuated envelope 30 having an input window 18 of a suitable material transmissive to input radiation such as borosilicate glass or quartz. The photocathode is disposed thereon. Suitable cooling means 19 is also provided. The electron emitter array 16 of the photocathode 12 is remote to the input window 18 and the electron emitting array 16 faces an electron multiplying electrode 33. The electrode 33 may be fabricated in the same manner and of similar structure as the photocathode 12. The photocathode 12 may be operated at a potential of about 10,000 volts negative with respect to ground and is provided by a suitable potential source 32. The spacing between the multiplier electrode 33 and photocathode 12 may be about 250 micrometers. The potential on the electrode 33 may be about 5,000 volts negative with respect to ground and is provided by a suitable potential source 34. The multiplier electrode 33 is identical to the photocathode 12 and is responsive to electron bombardment. With the potentials shown, one may obtain an output of about 500 electrons from the emitting array surface of the electrode 33 is response to each incident electron emitted from the photocathode 12. A target electrode 39 is provided adjacent the emitting array surface of the electrode 33 and may be of any suitable target material which exhibits the property of storage of charge in response to electron bombardment. The target 39 may be of any suitable type such as described in U.S. Pat. No. 3,440,476 by M. H. Crowell or of the type in U.S. Pat. No. 3,213,316 by G. Goetze et al.

An electron gun 36 is provided at the opposite end of the envelope with respect to the target structure 39 and directs a scanning electron beam over the target member 39 to read out the charge image in a well-known manner. This output signal is derived across an output resistor 38 of the target electrode 39. The electrode 39 may be operated at a potential of about 10 volts positive with respect to ground by means of a battery 41. The cathode of electron gun 36 may be operated at a potential of about ground.

Input radiations directed onto the photocathode 12 generate an electron image corresponding to the input radiations. This electron image is accelerated into the electrode 33 wherein the electron bombardment generates charge carriers causing the field electron emission from the emitter array surface of the electrode 33. These electrons are accelerated into incidence on the target electrode 39. By providing the electrode 33 between the photocathode 12 and the target 39, amplification of the input signal is obtained. The target 39 provides the necessary extraction potential for the electrode 33.

A method of fabricating the photocathode 12 or the electrode 33 is illustrated in FIGS. 5 through 9. The A figures are top view and the B figures are side views. A wafer 43 of a suitable p-type semiconductor such as silicon, germanium, gallium arsenide or other III-V semiconductor compounds including tertiaries such as gallium-indium-arsenide and indium-arsenide phosphide and having band gaps from 0.2 electron volt up to 3.0 electron volts may be utilized. The wafer 43 should be of a single crystal and have a suitable crystal orientation to provide the desired structure after etch. Crystal orientation of (111) and (110) have been utilized. One specific example is a 10 ohm centimeter p-type (111) silicon wafer having a thickness of about 25 to 50 micrometers. The wafer 43 may be cut from ingots grown by the Csochralski or float-zone methods.

Figure 6:
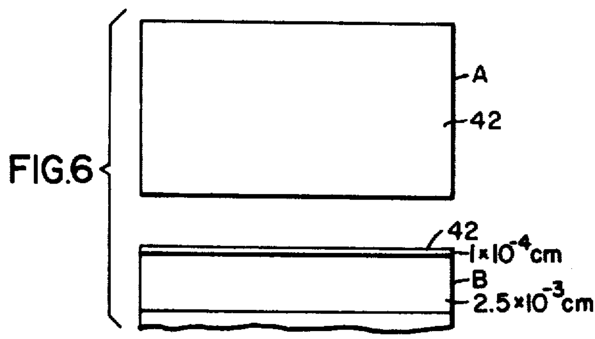
Figure 7:
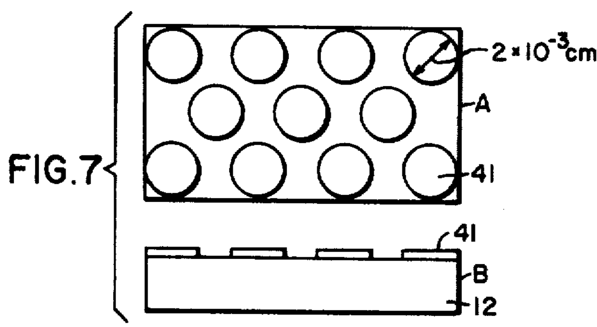

The first step in the operation is to oxidize the wafer 43 on one surface to provide an oxide coating 42 as illustrated in FIG. 6. The coating 42 should be about 1 micrometer in thickness. The oxide coating 42 may be provided by well-known techniques such as treating the wafer in a wet oxygen atmosphere at a temperature at about 1100°C for about 2 to 3 hours. The next step in the operation is to provide a photoresist material coating on top of the silicon dioxide layer 42 and then expose with radiation through an aperture mask and then remove the undesired portions of the photoresist coating. The photoresist technique is well known in the art and one may spin on about 0.7 micrometers of a suitable photoresist such as "Positop" and then expose with ultraviolet radiation and wash to provide a pattern of islands 41 of photoresist similar to the pattern shown in FIG. 7. The silicon dioxide coating 42 is then removed from the uncovered regions by a suitable etch such as buffered hydrofluoric acid etch (ammonium fluoride and hydrofluoric acid in 6:1 proportions) and then the unsoluble photoresist is removed from the islands 41 to provide a pattern of silicon dioxide islands 41 as illustrated in FIG. 7. The islands 41 are circular and may have a diameter of about 20 micrometers and are spaced apart on centers by about 25 micrometers.

Figure 8:
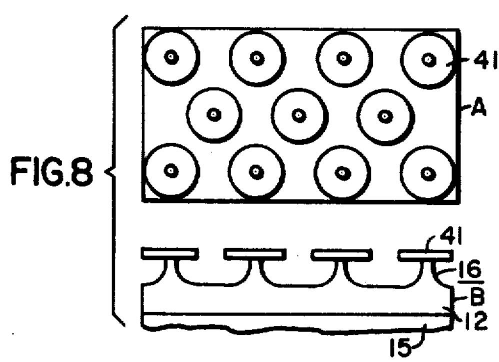

The next step in the operation is a P+ diffusion into the back surface of the wafer 43. This is a well-known technique and may be accomplished by exposing the wafer 43 to boron bromide $BBr_3$ at 950°C for a few minutes. The P+ layer 15 thus formed prevents or minimizes loss of radiation-generated carriers at the back surface due to recombination as well as provide an electrical contact. The next step in the operation is to rotate etch in a suitable etch such as 25 parts nitric acid, 10 parts acetic acid and 1 part hydrofluoric acid at 6.0 revolutions per minute using 50 cc of etch. This etch should be continued for about 20 minutes or until the tip dimensions of less than 0.5 micrometers have been achieved. Etching is stopped by quenching with water followed by rinsing first in water and then in methanol. The P+ layer 15 on the back surface is masked in this operation. Other suitable etchants for silicon are found in INTEGRATED SILICON DEVICE TECHNOLOGY, Volume X, Research Triangle Institute, Durham N.C., November 1965. The resulting structure is shown in FIG. 8 and illustrates the formation of the array 16 of projections 13 on the body portion 11 of the photocathode. The silicon dioxide islands 41 may then be removed by etching in buffered hydrofluoric acid etch and then rinsing in water, methanol and then drying.

Figure 9:
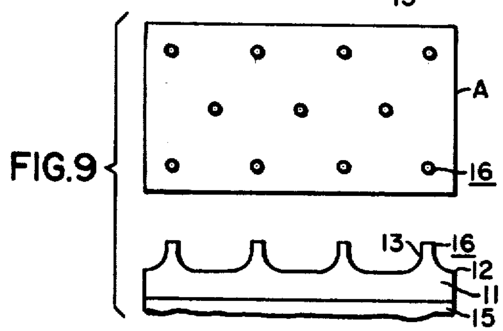

An optional next step is to provide a passivating coating 9 of silicon dioxide having a thickness of about 50 to 75 angstroms on the point array surface 16. The coating 9 may be formed by thermal growth in wet or dry oxygen at 600°C for several hours. The structure is then subjected to annealing in hydrogen at 350° to 450°C for 1 to 2 hours. The wafer can then be gettered. The completed photocathode 12 is then secured to the face plate 18. The resulting structure is shown in FIG. 9. It is obvious that the islands 41 may be formed by other methods and may be of different shapes.

The resulting structure provides a crystallographically continuous connection between the body portion 11 and the projections 13. That is the crystal perfection and low level of contaminating impurities is continuous throughout the body or substrate 11 and the projections 13. This is in contrast prior art methods which incorporate processing techniques that result in large concentrations of contaminating impurities in the tips of the projections. The high concentration of the impurities are difficult to remove by standard gettering techniques. Because of the internal crystalline perfection and the smooth external surface resulting from the etch process, high effective lifetimes is of minority carriers in the body 11 and projections 13 accrue. Bulk lifetimes of greater than 1 microsecond are obtained in the body 11 and projections 13. The efficiency of collection of minority carriers is much greater than would accrue in prior art III-V photoemitters. III-V photoemitters require heavily doped P+ regions to maintain net surface negative electron affinity. Heavily doped P+ substrates usually have lifetimes in the nanoseconds regions, a factor of 1,000 below that of the present invention. Thus, a 30 fold increase in collection depth of photocreated minority carriers is afforded with subsequent increases of efficiency of that order. It must be recognized that a high lifetime tip by itself would not provide adequate cross sectional area for efficient creation of carriers due to input light images. It is the combination of high lifetime emitting points crystallographically continuously fabricated on a high lifetime substrate region of significant thickness which provides for the extremely high efficiencies of this invention. Carriers created deep within the body 11 are because of high internal lifetime of the body capable of diffusing out to and along the length of the tip region where they are subsequently emitted. Thus, the efficiency is limited only by resolution degradation associated with inordinately thick targets.

It is also possible to provide a self-supporting structure by starting with a silicon wafer having a thickness of about 250 micrometers and diameter of 3.2 cm and then etching out a central region of this wafer of diameter of 2.5 cm to the desired thickness of about 25 micrometers and then proceeding with the steps illustrated in FIGS. 5 through 9. The resulting structure is a thin diaphragm of silicon with a supporting ring thereabout having a thickness of about 250 micrometers. In this manner the thin silicon wafer may be supported for utilization as a transmission type electron multiplier in which electrons are directed onto one surface and electrons are emitted from the opposite surface thereof.

Figure 11:
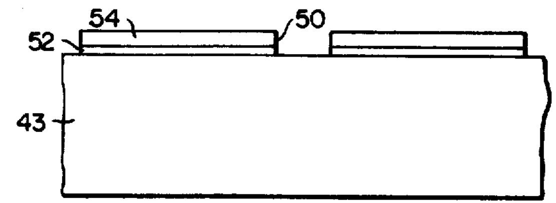
FIGS. 11, 12 and 13 illustrate steps in the manufacture of the device shown in FIG. 10.
Figure 13:
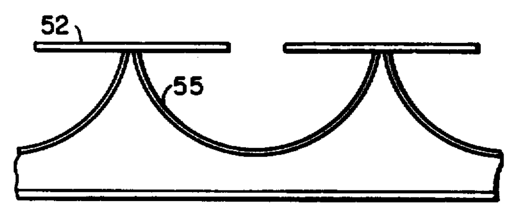
Figure 10:
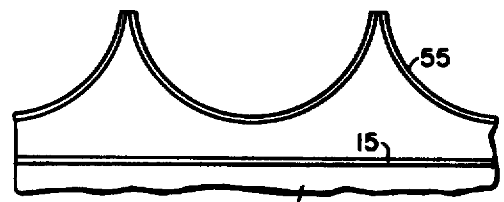
FIG. 10 illustrates another embodiment of the electron emitting projection array cathode for use in FIGS. 1 and 2.

Referring to FIG. 10, another embodiment is shown. The photocathode is similar to that previously described but included an oxide coating 50 on the emitter array 16. The fabrication of the device is illustrated in FIGS. 11 and 13. A wafer 43 having a thickness of about 25 to 50 micrometers is provided. A coating 52 of silicon nitride SiN is provided on one surface of the wafer 43. The thickness of the coating is about 0.2 micrometers and may be deposited by the ammonolysis of silane at 700°–900°C for about 20 minutes.

The next step is to provide a coating 54 of silicon dioxide of a thickness of about 0.2 micrometers. The coating 54 may be thermally grown by heating the wafer in dry or wet oxygen to 1,100°C or may be deposited by thermal decomposition of silane or oxygen at 600°–700°C. A photoresist coating is then placed on the coating 54, exposed and a mosaic of islands of photoresist of a similar pattern shown in FIG. 7 is obtained.

Figure 12:
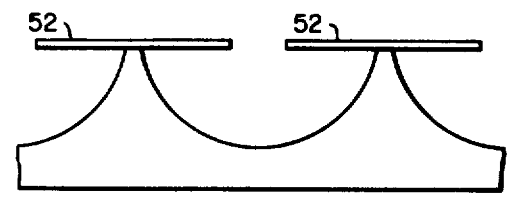

The unprotected portion of the coating 54 is then removed by a suitable etch such as buffered hydrofluoric acid and then the unprotected coating 52 is removed by etching in hot phosphoric acid to provide the structure shown in FIG. 11 and with the pattern similar to that shown in FIG. 7. At this stage the remaining oxide pattern can be removed if required. The silicon wafer 43 is then etched using a nitric, acetic and hydrofluoric acids mixture as previously described. Rather than etching the points down to about 0.5 micrometers, the etch is stopped when the point diameter is about 1.5 micrometers. This structure is shown in FIG. 12. The next step is to provide the oxide coating 55 on the array surface. The oxide coating 55 is formed by thermal oxidation. The use of thermal oxidation in forming the oxide coating 55 serves several advantageous functions in this embodiment. The thermal oxidation which proceeds in a slow and well-controlled manner enables the silicon points to be reduced in diameter in a similar manner. If necessary, the tip diameter could be trimmed to the required dimensions by repeated oxidation and oxide-removal steps. In the specific device illustrated the 1.5 micrometer diameter tip would be reduced to a 0.5 mm. tip intimately surrounded by 1.0 micrometer oxide coating. This is shown in FIG. 13. Upon removal of the nitride islands 52 the emitter points consist of a clean 0.5 micrometer diameter silicon core surrounded by a 1.0 mm. thick oxide coating. The oxide-coated array with islands in place can be annealed in hydrogen at 450°C. The nitride islands are then removed and the oxide coating $+H_2$ anneal provides a means of passivating the surface to substantially reduce background dark current in the device. The final structure is illustrated in FIG. 10.

Figure 14:
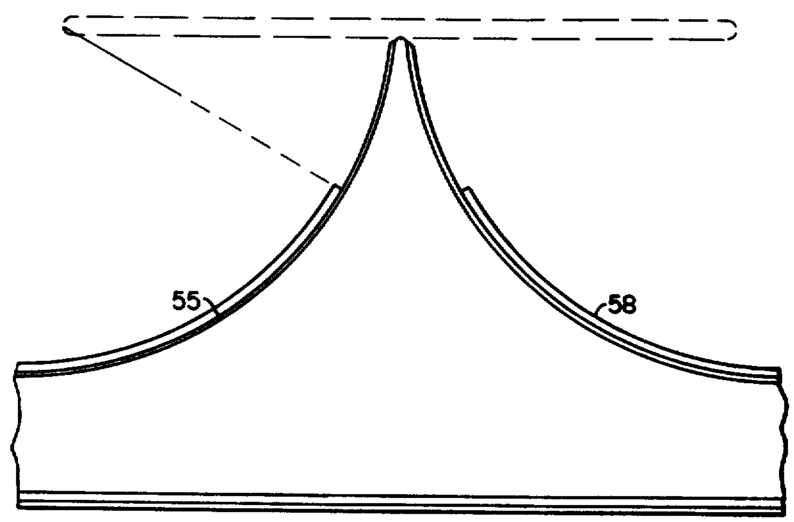
FIG. 14 illustrates a further embodiment of the invention illustrating an electron emitter projection array cathode for use in FIGS. 1 and 2.

FIG. 14 illustrates another embodiment, prior to removal of the islands 50 a layer 58 of suitable electrical conductive material such as gold having the thickness of about 0.1 micrometers can be evaporated at about 60° angle to cover the passivation layer 55 but not touching the tip as is illustrated in FIG. 14. The reflective layer 58 provides means of enhancing the sensitivity of the wafer to input radiations through internal reflection. In addition, the layer 58 provides means of applying an electrical potential across the front emitting area of the photocatode which photocathode be utilized to enhance the field involved at the top of the emitter projections and also used for gating or modulating the emission.

Figure 16:
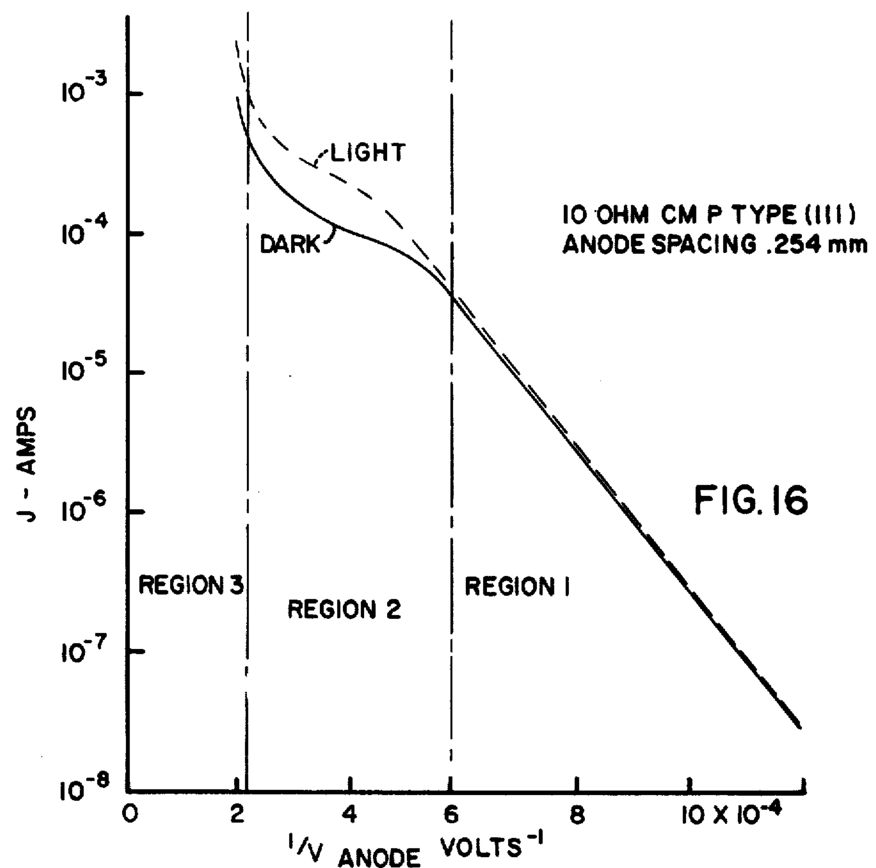
FIG. 16 illustrates an experimental Fowler-Nordheim plot of log J. v. 1/(V anode) for P-type silicon, 10 ohm cm(111) emitter array at room temperature for the photocathode shown in FIG. 1.
Figure 20:
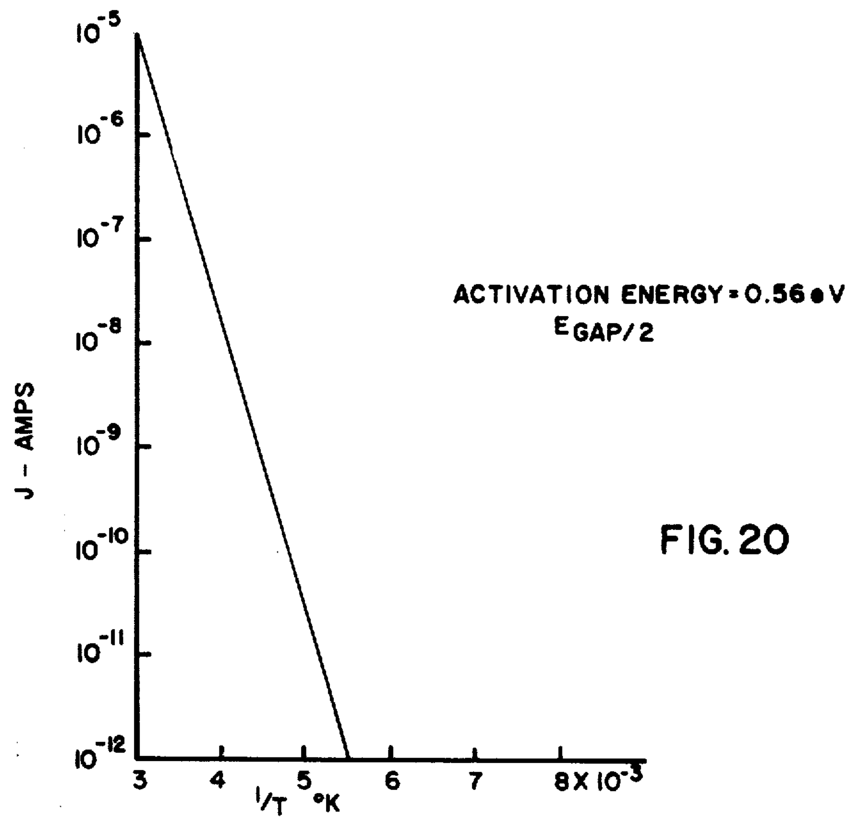
FIG. 20 is an Arrhenius plot of data shown in FIG. 19.

In FIG. 16 there is shown an F-N plot of a typical device. The linearity of this plot at low anode voltages indicates that the emission is Fowler-Nordheim limited. The tendency of the curve to saturate for a high anode voltages indicates the beginning of the source-limited mode of operation. In this case, the high dark current is being provided by the high surface and bulk generation in the ungettered and unpassivated type assemblies. However, even in this low lifetime [nongettered] specimen, a reflection photoemissive sensitivity exceeding 1,500 microamperes per lumen was observed. This is practically equivalent to the value of the 1,650 microamperes per lumen reported in the literature for certain III-V compound emitters. It must be emphasized that over 50,000 points were simultaneously and uniformly emitting.

Figure 17:
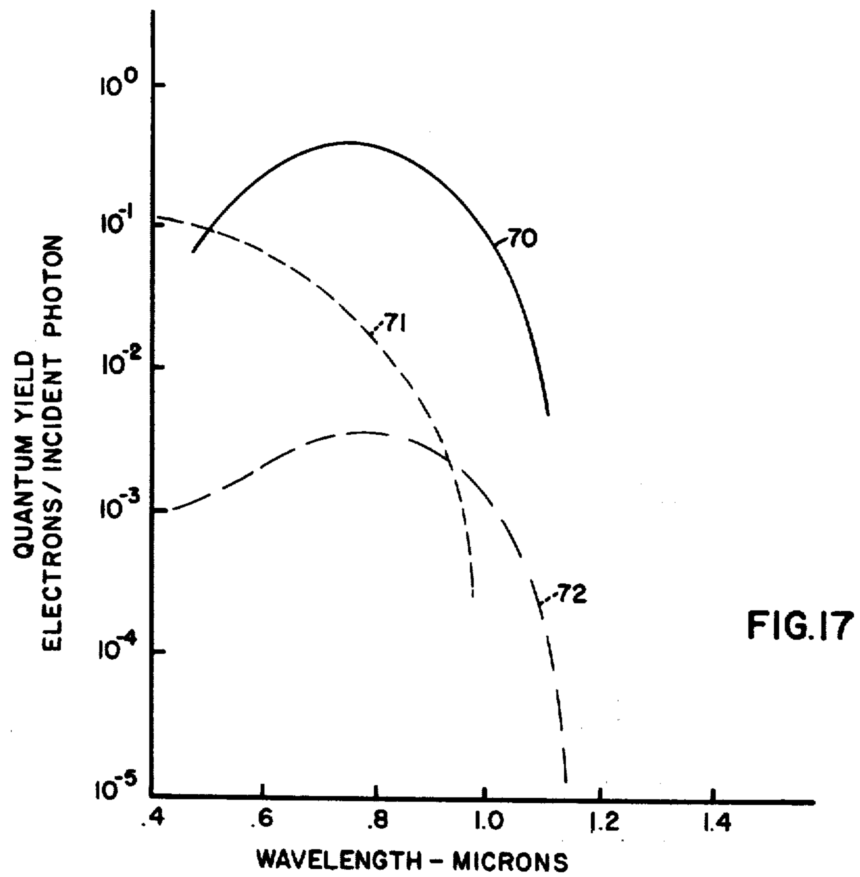
FIG. 17 illustrates the response of the prior art structures in comparison with the silicon field emitter array.

FIG. 17 indicates the response of the photocathode as described herein by curve 70 with respect to wavelength of input radiation. Curve 71 is a typical S-25 photocathode and curve 72 is a typical S-1 photocathode.

It should be noted that this particular method of fabrication described herein not only lends itself to the manufacture of transmissive type structures, that is, where light or energy is directed on one side and emission from the opposite side but also these techniques may be utilized to fabricate devices wherein the illumination is directed onto the same surface as the electron emission array. In addition, the techniques may be utilized to fabricate conventional cold field emitters whether made up of semiconductive materials or metals.

In the specific embodiment illustrated, the mosaic of resist material is made up of a plurality of circular islands. It is obvious that these islands may be of any desirable shape such as square or rectangular. In addition, the type of crystal orientation definitely affects the density of the emitter projections and it was found that the (111) and (110) were particularly desirable.

We claim as our invention:

1. The method of fabricating a large area field electron emitter device comprising the steps of providing a wafer of a semiconductive material of a single crystal material and having a band gap in the range of 0.2 to 3.0 electron volts and a resistivity of 0.10 ohm centimeter or greater, depositing an etch-resistant array pattern of islands over said wafer on one surface thereof, etching said semiconductive wafer in a manner to remove a portion of the semiconductive material from beneath and between the islands of said array to provide a centrally located support projection for each of said islands having a diameter of about 1.5 microns at the upper point of said support adjacent said island, growing an oxide layer on said etched out surface of said wafer to provide an oxide coating having a thickness of about 0.5 microns and providing a remaining central region of semiconductive material at the point supporting said island of about 0.5 microns, removing said resist array to provide a large area of field emitters comprised of a substrate of semiconductive material with a plurality of projecting electron emitters extending from said substrate in a crystallographically continuous manner in which said projecting electron emitters comprise an emitting point having a diameter of about 0.5 microns.

2. The method set forth in claim 1 in which said resist pattern includes a coating of silicon nitride.

* * * * *